United States Patent [19]
Schuermann

[11] 3,916,144
[45] Oct. 28, 1975

[54] METHOD FOR ADJUSTING RESISTORS BY LASERS

[75] Inventor: Walter Schuermann, Selb, Germany

[73] Assignee: CRL Electronic Bauelemente GmbH, Germany

[22] Filed: Mar. 26, 1974

[21] Appl. No.: 454,804

[30] Foreign Application Priority Data
Apr. 19, 1973 Germany............................ 2319899

[52] U.S. Cl............................. 219/121 LM; 29/620
[51] Int. Cl.² ............................................ B26F 3/14
[58] Field of Search................ 29/620; 219/121 LM; 338/195

[56] References Cited
UNITED STATES PATENTS
| | | | |
|---|---|---|---|
| 3,400,456 | 9/1968 | Hanfmann | 29/620 |
| 3,509,511 | 4/1970 | Soroka | 338/195 |
| 3,521,201 | 7/1970 | Veteran | 338/195 |
| 3,534,472 | 10/1970 | DeJong | 219/121 LM |

*Primary Examiner*—E. A. Goldberg
*Attorney, Agent, or Firm*—Ostrolenk, Faber, Gerb & Soffen

[57] ABSTRACT

A method for adjusting the resistance of cylindrical layer resistors comprising utilization of a laser beam. The resistor is rotated about its longitudinal axis at a predetermined rotational speed. Simultaneously therewith, a pulsating laser beam is moved at a predetermined linear speed along a line parallel to the longitudinal axis of the resistor element. The resistor rotational speed is preferably an integral multiple of the linear speed of the laser beam. The impulse time ($t$) of the laser beam preferably lies within the range from 0.1 to 0.9 of the period time ($T$). The above relationships produce a resistance element of high quality and having a uniform current density preventing premature burn out of the elements.

5 Claims, 7 Drawing Figures

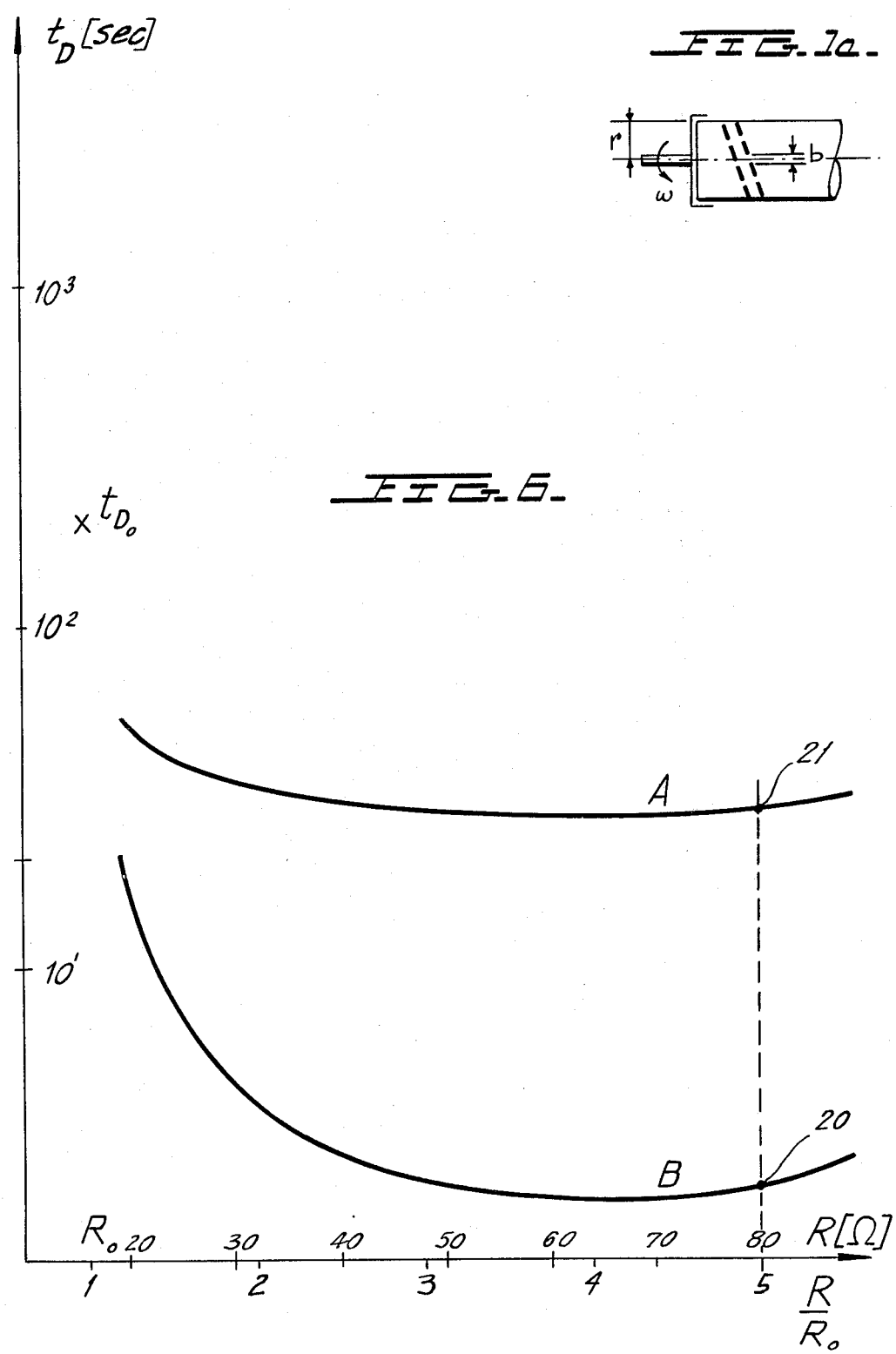

METHOD FOR ADJUSTING RESISTORS BY LASERS

The present invention relates to a method for adjusting resistance of layer resistance elements and more particularly to a novel method for adjusting the resistance of cylindrical layer resistors through the use of pulsating laser beams and further relates to a novel resistance element produced through the use of such method.

BACKGROUND OF THE INVENTION

The present invention describes a method for adjusting cylindrical layer resistors through the use of pulsating laser beams whereby the laser beam is moved at a predetermined velocity along a line substantially parallel to the longitudinal axis of the resistance elements, simultaneous with the rotation of the layer resistance element about its longitudinal axis.

Layer resistors of this type can be made by known present day methods to obtain very small adjustment factors between 1.10 and 1.30 or alternatively very large adjustment factors of the order of 10 and having the desired quality. Adjusting procedures for producing resistance values which are greater than 10 times the initial value of the resistance element prior to use of the adjusting technique have, however, been conditionally reached with known procedures which are either quite expensive or which result in the production of layer resistance elements of poor quality.

The adjustment factor is defined as the relationship of the final resistance value (after adjustment) to the initial value (before adjustment).

It is possible through present day techniques to increase the resistance value of a layer resistance by formation of a helical groove in the layer resistance which groove is formed by known methods. One exemplary method utilizes a rotating grinding disc which is linearly moved at a predetermined speed in the direction parallel to the axial length of the resistance element, which is simultaneously rotated about its longitudinal axis at a predetermined angular velocity. The pitch of the helical groove in the layer resistance is directly proportional to the linear speed of the rotating grinding disc and is inversely proportional to the angular velocity of the resistance element. This method may be advantageously employed for forming resistance elements having an adjustment factor of the order of 10. However if an adjustment factor of smaller than 10 is desired it has been found that the loading properties of adjusted resistances are unsatisfactory. In order to obtain an adjustment factor of less than 10, it is necessary to form a helical groove in the layer resistance of a very large pitch when employing the conventional technique referred to above. If the pitch is greater than the half length of the resistance element measured between its connecting end caps it has been found that this will result in a non uniform current distribution along the resistance path. This results in a substantial increase in current density at the ends of the helical turns of resistance and between such turns and the connecting end caps thereby increasing evaporation of material at these locations. The width of the current path between adjacent helical turns however decreases, causing a further increase in current density which leads to a reduction in loadability of the resistors. Extreme conditions have been found to come into play when both of the endmost turns adjacent the resistance element end caps lie diagonally opposite one another along a generating line of the cylindrical layer resistor.

One technique for overcoming these problems is set forth in U.S. Pat. No. 3,468,011 issued Sept. 23, 1969 which teaches the production of a higher loadable resistor having improved current density distribution at the ends of the resistor layer such that the current density is made more constant, the technique therein being that of providing multiple loop turns in the resistor layer through a grinding method. These methods however have been found to be quite tedious and expensive.

Another possible method for providing small adjustment factors takes into consideration the grinding in of stripes in the resistance layer along a generating line of the cylindrical resistance body. With these known methods, however, it has been found that it is not possible to obtain an adjustment factor of greater than 1.30 economically thus leading to a maximum increase in resistance 30%.

However it is still possible to adjust the resistance factor through the use of a meandering grinding technique as is set forth for example in the publication entitled "Bauelemente de Nachrichtentechnik" by H. Nottebrock, Volume 11, Widerstande, 1949, Seite 79. This method has been found to be quite expensive due to the lengthwise striping and the superimposable slant striping required for adjustment purposes.

All of the above mentioned known adjustment techniques have, in addition to the described disadvantages, the common disadvantage of being incapable of economically producing adjustment factors in the range between 1 and 10.

BRIEF DESCRIPTION OF THE INVENTION

The present invention is characterized by providing a simple method for adjusting layer resistors through the employment of laser beams wherein the adjustment range is between 1 and 10 and can be higher if desired, whereby the current density distribution of layer resistors produced in accordance with the invention and whereby the adjusted resistance are both more uniform as compared with known methods for adjusting resistors.

The problems of prior art adjusted resistors are solved in accordance with the present invention through the employment of a laser beam which is pulsated so as to provide an uninterrupted resistance path.

By selection of the period length of the pulsating laser beam and through the choice of relationship between the impulse length to the period length the adjustment grooves are definitively fixed.

The critical aspect of the groove pattern resides in the relationship of the time ($Tu$) for a point on the surface of the cylindrical resistor to complete one full revolution to the period time (T) of the pulsating laser beam. This relation is a whole number ($n$) such that: ($Tu/T$) = $n$.

By adhering to this relationship, the adjustment grooves and the resistance path of the helical turns is always at the same level, i.e., along the same generating line (a generating line being defined as a line along the surface of the cylindrical resistor layer which is parallel to the longitudinal axis of the resistance element).

When the relationship of the time ($Tu$) which is required for a point along the surface of the cylindrical resistor to complete one revolution to the period time (T) of the pulsating laser beam is a rational number such that:

$$Tu = (n + 1/n_2) T$$

Then, in accordance with the value $n_2$, the pitch of the adjustment grooves or the resistance path lie along the same generating line in cases where $n_2 Tu$ is an integral multiple of the period time of the pulsating laser beam.

By varying the relationship between the time required for one full revolution of the layer resistor and the period time of the pulsating laser beam, this establishes the pattern of the helical grooves. According to the invention, the obtainable resistance value is proportional to the position of the resistance path, the superimposable sequential turns, and the relationship of the width of the resistance path to the length of the helical grooves.

Solving the problems of the prior art in accordance with the present invention the relationship of the time for one full revolution of the cylindrical resistance layer relative to the period time of the pulsating laser beam is chosen so that after two revolutions, the resistance path and the adjusting grooves lie along the same generating line.

The technique of the present invention provides particular advantages among which are the ability to provide an adjustment factor between one and 10 and higher if desired with the adjustment factor being easily regulated, whereby the current density distribution of the entire resistance layer is relatively constant so that current density peaks, which normally lead to thermal overloading and resistance burn-through, are avoided. Another considerable advantage is accordance with the present invention is the capability of producing layer resistors which are induction poor enabling their use to great advantage in high frequency applications.

BRIEF DESCRIPTIONS OF THE FIGURES AND OBJECTS

It is therefore one object of the present invention to provide a novel method for adjusting layer resistors through the use of pulsating laser beams.

Another object of the present invention is to provide a novel method for adjusting the resistance values of layer resistors through the formation of discontinuous grooves along the surface of the resistance layer.

Still another object of the present invention is to provide a novel method for adjusting the resistance of resistance elements having a cylindrical resistance layer through the formation of discontinuous grooves which are cut into the resistance layer and which lie along a helical path whose pitch is altered in acordance with the end resistance value desired.

Still another object of the present invention is to provide a novel method for adjusting the resistance of resistance elements having a cylindrical resistance layer through the formation of discontinuous grooves which are cut into the resistance layer and which lie along a helical path wherein the lengths of the discontinuous grooves are altered in accordance with the end value of resistance desired.

The above, as well as other objects of the present invention, will become apparent from a consideration of the accompanying description and drawings inn which:

FIGS. 1 and 1a show plan views, partially sectionalized, of a resistance element treated in accordance with the method of the present invention.

FIG. 6 is a plot of curves showing relationship of burn-through time as a function of achieved end resistance values when employing present day techniques and when employing the technique of the present invention.

DETAILED DESCRIPTION OF THE INVENTION

Figure 1:
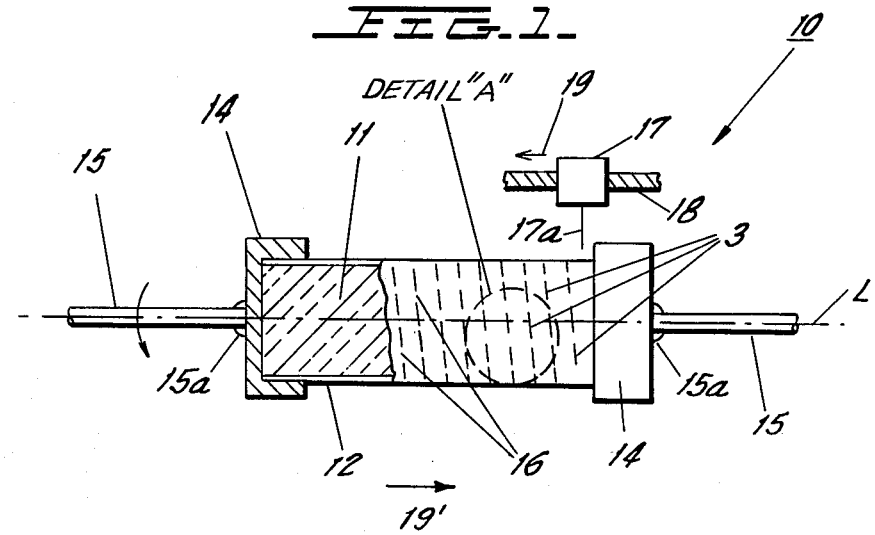

FIG. 1 shows a resistance element 10 which has been adjusted in accordance with the technique of the present invention and which is comprised of a ceramic body 11 having a resistance layer 12 deposited or otherwise formed upon the cylindrical surface of body 11. A pair of conductive end caps 14,14 are secured to the opposite ends of element 10 and make good electrical contact with layer 12 so as to provide a low resistance conductive path there between. Conductive wire connectors 15,15 are joined to the end caps as shown. For example, the jointure may be by soldering or weldments 15a;15a. The element 10, as a result of having been adjusted in accordance with the method of the present invention, has provided in its resistance layer a plurality of adjustment grooves which collectively define a helical curve and are discontinuous in nature thereby establishing the resistance paths 16 between adjacent adjustment grooves along the helix.

The method employed for adjusting the resistance value comprises rotating the element 10 about its longitudinal axis L at a predetermined rotational speed. A laser beam generating source 17, which may for example be mounted upon a worm drive member 18 which, when rotated, moves the laser beam generating device 17 in the direction shown by arrow 19 and along a linear path substantially parallel to the longitudinal axis L.

Alternatively, the laser beam source 17 may be held stationary and the resistance element may be linearly moved in the direction 19' as the element is rotated about its longitudinal axis. Also, if desired, the source 17 may be revolved about a circular path and element 10 may be linearly moved to obtain the desired helical path. The three adjustable aspects of the system are the rotational speed of the resistance element (or the revolving of source 17), the linear speed of movement of the laser beam generating source (or the element 10), and the pulsating rate of the laser beam 17a which is directed toward the resistance layer 12 so as to form the grooves 3 therein.

Figure 2:
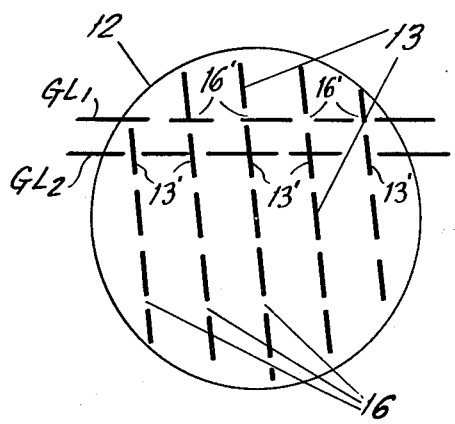
FIGS. 2 through 4 are plan views of sections of the resistance layer of FIG. 1 in the region of detail "A" showing different patterns producible in the surface layer.

FIG. 2 shows an enlarged view of detail "A" of FIG. 1 showing the exposed surface of the resistance layer having adjustment grooves 13 and resistance paths 16 between the adjustment grooves 13. It can be seen that the adjustment grooves and resistance paths of adjacent turns of the helical path each lie along common generating lines. For example, FIG. 2 shows the resistance paths 16' of adjacent turns as lying along generating line $GL_1$ and shows the adjusting grooves 13' of adjacent turns as lying along the same generating line $GL_2$. It can be seen that the remaining resistance paths and adjustment grooves are similarly arranged. This arrangement is obtained by selective time (Tu) for one full revolution of the resistance element about its longitudinal axis, so that it is proportional to an integral multiple of the period time (T) of the pulsating laser beam.

Figure 3:
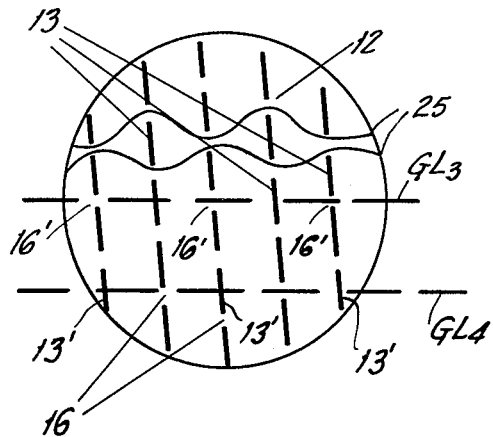

FIG. 3 shows a similar enlarged view of detail "A" wherein the adjacent resistance paths of every other turn lie along the same generating line and similarly wherein the alternating turns of adjacent adjustment grooves likewise lie along the same generating line. For example, it should be noted that the resistance paths 16' of every other turn lie along generating line $GL_3$ while the adjustment grooves 13' of every other turn lie along the common generating line $GL_4$. It should be obvious that the remaining resistance paths and adjustment grooves are similarly arranged. In order to obtain this meander or sinusoid-like resistance path pattern and the corresponding pattern of current flow along current paths 25 (only two of many such paths shown), the relationship between $T_u$ and T is such that:

$$T_u = (n_1 + \tfrac{1}{2})\,T$$

where $T_u$ is the time period for one full revolution of the resistance element, T is the time period between successive laser beam pulses and n is an integral number greater than one.

Figure 4:
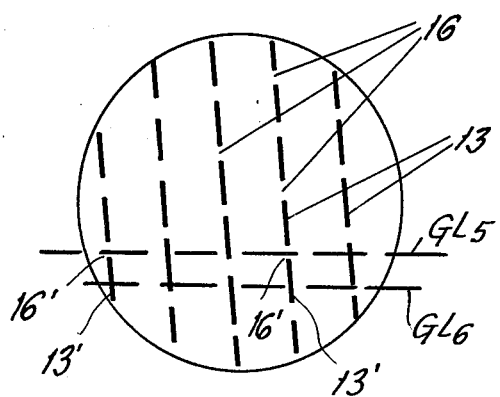

FIG. 4 shows still another possible pattern obtainable through the rational relationship between T and $T_u$ in accordance with the equation:

$$T_u = (n_1 + 1/n_2)\,T$$

so that, according to the value of $n_2$, here equal to three, the resistance paths of every $(nz + 1)$th turn, here every fourth turn, lie along the same generating line. For example note that resistance paths 16' of every fourth turn lie along generating line $GL_5$, while the adjustment grooves 13' of every fourth turn lie along the generating line $GL_6$.

Figure 5:
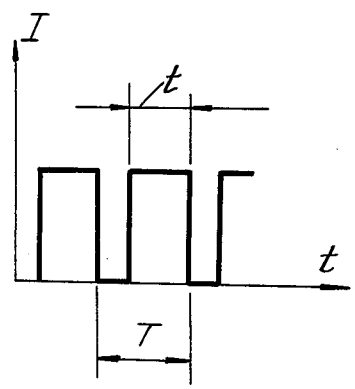
FIG. 5 is a plot showing the relationship of laser beam current intensity versus time.

FIG. 5 is a waveform plot showing the time dependency between the intensity I of laser beam 17a with the period time T and the impulse time $t$. The pulsating rate of the laser beam is preferably such that the beam is turned on through a fraction of the period time T such that:

$$0.1T \leq t \leq 0.9T$$

and preferably such that:

$$0.3T \leq t \leq 0.8T$$

It can be seen that the pitch of the helical path defined by the adjustment grooves 13 is inversely proportional to the rotating speed of element 10 about its longitudinal axis; and is directly proportional to the linear speed of movement of the laser beam generating device as it moves in the direction shown by arrow 19. The width of the resistance filament 16 is proportional to the difference of the period length (T) and impulse length ($t$) and proportional to the peripheral speed of the cylindrical resistance element (see FIG. 1a) which means:

$$b = (T-t)\cdot V$$

T,t—see FIG. 5

$$v = r\cdot\omega$$

where V = linear velocity; $r$ = radius of element 10; $\omega$ = angular velocity.

Adjustment of the period time (T) relative to the rotational speed of element 10 establishes the pattern of adjustment grooves and resistance paths relative to the generating lines GL.

FIG. 6 shows the dependency of burn-through time ($t_D$) of adjusted resistance elements for resistance elements adjusted through the method of the present invention (curve A) and for resistance elements adjusted in accordance with conventional present day techniques (curve B).

In order to obtain measurements for the burn-through time, the layer resistance elements of the type shown in FIG. 1, for example, are overloaded until they glow red. Current density peaks along the resistance element are clearly observable as having a much brighter glow.

The span of time between the initiation of overloading until burn-through has been found to be consistently short in elements in which current density peaks are clearly observable. From the curves of FIG. 6 it can clearly be seen that for elements whose adjustment factors approach 10 a significantly longer burn-through time is observed for resistance elements adjusted in accordance with the present invention as compared to resistance elements adjusted in accordance with conventional techniques. For example, in a resistance element whose adjusted value (R) is five times greater than its initial value ($R_0$) burn-through time for a resistance element adjusted in accordance with conventional techniques is of the order of one and a half seconds (see point 20 along curve B) while burn-through time of a resistance element adjusted in accordance with the technique of the present invention is of the order of 25 seconds (see point 21 on curve A). A related point $t_{D_0}$ shows the burn-through time of a resistance element which has not been adjusted and which is of the same design for example as the element 10 shown in FIG. 1. It can be seen that the burn-through time of resistance elements adjusted in accordance with a method of the present invention compare quite favorably with the burn-through time observed for unadjusted resistance elements and, in any case, are remarkably improved as compared with resistance elements adjusted in accordance with present day techniques.

It can clearly be seen therefore that a much more uniform current density distribution is obtained through the adjustment of resistance element in accordance with the method of the present invention.

Although there have been described preferred embodiments of this novel invention, many variations and modifications will now be apparent to those skilled in the art. Therefore, this invention is to be limited, not by the specific disclosure herein, but only by the appended claims.

What is claimed is:

1. A method for adjusting the resistance value of resistance elements having a single cylindrical resistance layer whereby a substantially uniform current density distribution is obtained over the entire surface of the resistance layer, comprising the steps of:

a. generating a pulsating laser beam having a time period (T) between successive pulses and directing said laser beam toward said resistance layer;

b. rotating the resistance element about its longitudinal axis with a rotation time ($T_u$) required to complete one full revolution equal to a rational multiple number ($n$) of the pulsating laser beam time period (T), according to the formula $T_u = n.T$; where the number $n$ is greater than 1:

c. selecting a common impulse duration time ($t$) in the range of 0.1 to 0.9 times the time period (t) of the laser beam for all pulses of said pulsating laser beam to form at least one discontinuous adjustment groove in said resistance layer, each adjustment groove encircling less than one-half the circumference of the resistance layer; and d. linearly moving the pulsating laser beam in a direction substantially parallel to the longitudinal axis of the resistance element.

2. A method of claim 1 wherein said discontinuous adjustment grooves lie along a helical path.

3. The method of claim 1 in which the impulse time preferably lies in the range from 0.3 to 0.8 of the period time.

4. The method of claim 1, wherein step (b) further comprises the step (e) of selecting the multiple number (n) in accordance with the formula $n = (t''/T - 1/n_2)$, where $n$ is a first integral number greater than one and $n_2$ is a second integral number greater than one, to obtain meander-like current paths along the surface of said resistance layer for minimizing inductive effects of the adjustment grooves.

5. The method of claim 1, wherein step (b) further comprises the step of selecting the rational multiple number (n) in accordance with the formula $n = (T_u/T - \frac{1}{2})$, where $n$ is an integral number greater than 1, for maximizing current loadability of said resistance element even while minimizing inductive effects.

* * * * *

UNITED STATES PATENT OFFICE
CERTIFICATE OF CORRECTION

Patent No. 3,916,144                         Dated October 28, 1975

Inventor(s) Walter Schuermann

It is certified that error appears in the above-identified patent and that said Letters Patent are hereby corrected as shown below:

Title page, left-hand column, item "[73]", change "CRL Electronic Bauelemente" to -- Draloric Electronic --.

Signed and Sealed this thirteenth Day of April 1976

[SEAL]

Attest:

RUTH C. MASON
*Attesting Officer*

C. MARSHALL DANN
*Commissioner of Patents and Trademarks*